_United States Patent Office_

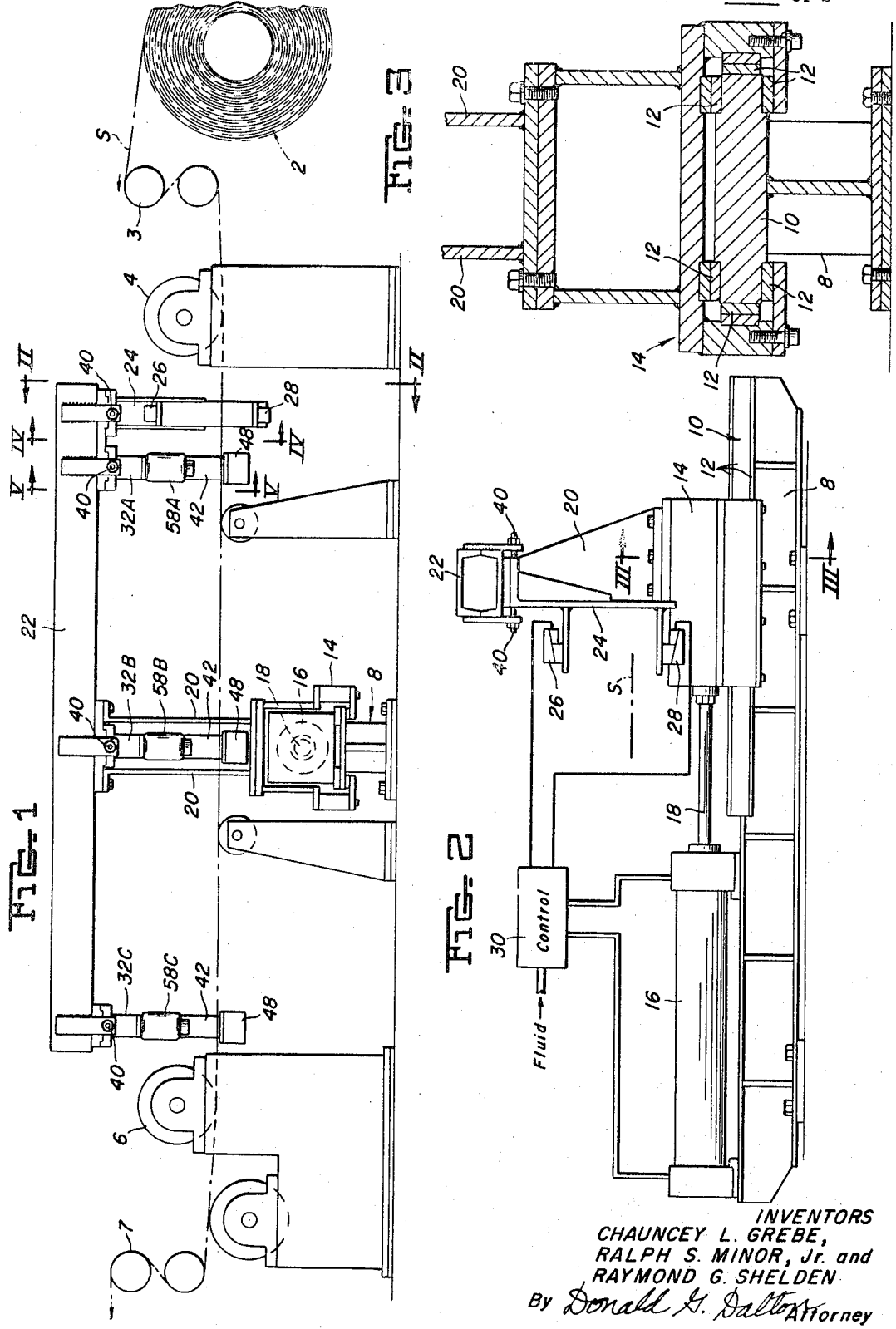

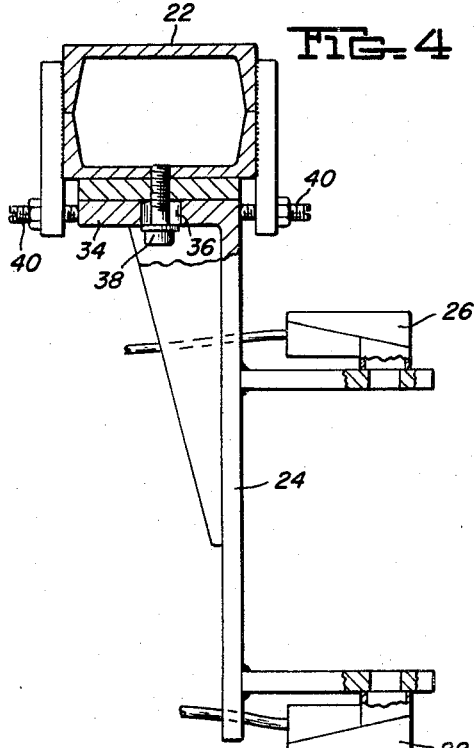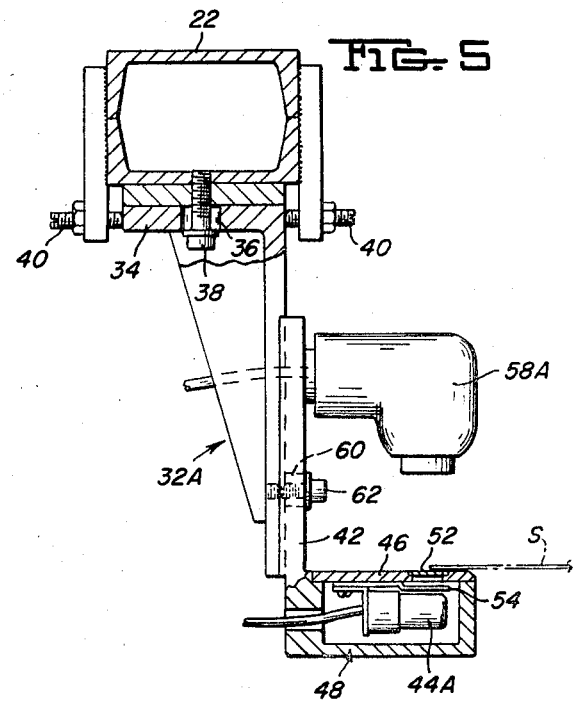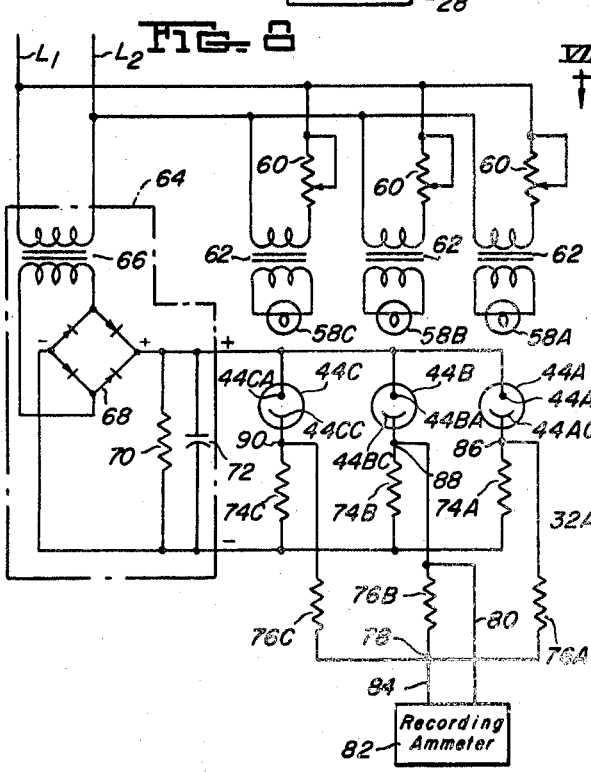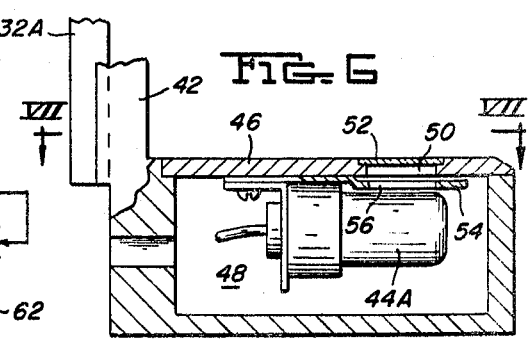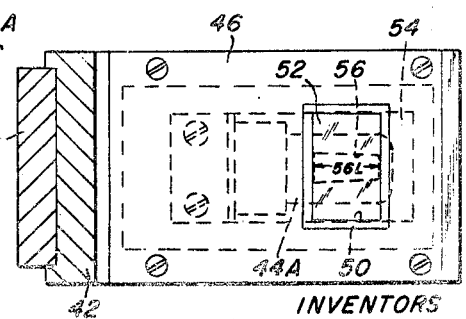

3,428,818
Patented Feb. 18, 1969

3,428,818
METHOD AND APPARATUS FOR DETERMINING CAMBER IN A MOVING STRIP
Chauncey L. Grebe, 3116 Athene Court, Concord, Calif. 90220; Ralph S. Minor, Jr., 3313 Las Huertas Road, Lafayette, Calif. 94025; and Raymond G. Shelden, Rte. 1, Box 264B, Oakley, Calif. 94561
Filed Mar. 4, 1965, Ser. No. 437,068
U.S. Cl. 250—219       13 Claims
Int. Cl. G01n 21/30

ABSTRACT OF THE DISCLOSURE

A method and apparatus for determining camber in a longitudinally moving strip in which three longitudinally spaced apart aligned stations are arranged adjacent one edge of the moving strip and the transverse distance of that edge from each station is measured. Each station includes a light source and a photo sensitive device located on opposite sides of the strip with the photo sensitive device being in an enclosure with an aperture in the enclosure on the side adjacent the strip, the apertures at the three stations being equally spaced from the longitudinal center of the strip. Means responsive to the light on the photo sensitive device measures the transverse distance of the said edge from each of the stations. Means are also provided to compare these transverse distances.

---

This invention relates to a method and apparatus for determining camber in a moving strip and particularly for measuring camber of a steel strip in a processing line. Steel strip, such as tin plate, is often furnished to the customer in coil form and the customers have inspection standards for camber and weave by which they accept or reject the coils. These standards are based on measurements made on sheared sheets by means of squaring tables and dial gauges. Mill testing for camber has been confined generally to shearing off the head or tail end of a coil, rolling the sheared end out on the floor, and measuring the deviation of the strip edge from a straight line. The camber in a strip often varies throughout its length so that camber or lack of camber in the head or tail end of a length of strip does not mean that intermediate portions of the strip are satisfactory or not satisfactory. Prior to our invention when checking camber at an intermediate portion of the strip it was necessary to stop the processing line, cut out a length of strip, and determine the camber as set forth above. This was an expensive and time consuming operation.

It is therefore an object of our invention to provide a method of measuring camber or weave in a moving strip of material.

Another object is to provide apparatus which can measure the camber or weave in a moving strip of material without contacting the strip.

These and other objects will be more apparent after referring to the following specification and attached drawings, in which:

FIGURE 1 is a longitudinal elevation of the device of our invention;

FIGURE 2 is a view taken on the line II—II of FIGURE 1;

FIGURE 3 is a view taken on the line III—III of FIGURE 2;

FIGURE 4 is a view taken on the line IV—IV of FIGURE 1;

FIGURE 5 is a view taken on the line V—V of FIGURE 1;

FIGURE 6 is an enlarged sectional view of a portion of FIGURE 5;

FIGURE 7 is a view taken on the line VII—VII of FIGURE 6; and

FIGURE 8 is a schematic wiring diagram of the electrical portion of our invention.

Referring more particularly to the drawings, reference numeral 2 indicates an uncoiler for supporting a coil of strip S. The strip S passes from the uncoiler 2 around a bridle 3 and beneath spaced apart rolls 4 and 6 which support the strip S in horizontal position. The rolls 4 and 6 are preferably arranged at the entry end of processing equipment, not shown, with a bridle 7 being provided for pulling the strip S longitudinally. Located between the rolls 4 and 6 is a flanged base member 8 which extends transversely of the path of travel of the strip S. The base member 8 includes an upper flange 10 having wear plates 12 around its outer edges which form ways for receiving a cross-head 14. A hydraulic cylinder 16 is also mounted on the base 8 with its piston rod 18 connected to the cross-head 14. A column member 20 extends upwardly from the cross-head 14 and has a horizontal beam member 22 attached to the top thereof. The beam member 22 is arranged parallel to the longitudinal center of the processing line and etxends toward the rolls 4 and 6. A downwardly extending bracket 24 is fastened to the entry end of the beam 22 and supports sensing heads 26 and 28 of an Askania Edge Control—Model No. 2020–BA manufactured by General Precision Equipment, Inc. The sensing heads 26 and 28 are connected to control 30 which controls the flow of fluid to the cylinder 16 so that one longitudinal edge of the strip S will always be in a given relationship with the cross-head 14. This control is a standard control and other edge controls may be substituted therefor or the position of the cross-head 14 can be controlled manually.

Equally spaced along the length of beam 22 are three downwardly extending brackets 32A, 32B and 32C. In the particular arrangement shown the center to center distance between adjacent brackets is 2¼ ft. The brackets all have the same construction so that only one will be described in detail. As best shown in FIGURE 5 bracket 32A includes a top horizontal leg 34 having a slotted hole 36 therein for receiving a screw 38. Set screws 40 supported by the beam 22 may be used to move the brackets horizontally in a transverse direction when the set screw 38 is loosened. An L-shaped member 42 is secured to the lower end of the bracket and houses a phototube 44A in the horizontal leg thereof. The phototube 44A must be of a type having a light sensitive cathode of substantial length. Standard phototube GL–925 having a cathode ¾″ in length and ¾″ in diameter is satisfactory. The tube 44A is arranged so that a vertical plane through the longitudinal axis of the tube is substantially normal to the edge of the strip. A cover plate 46 completes an enclosure 48 for the tube 44A. The cover plate 46 has an aperture 50 therein which is closed by means of a transparent plate 52 preferably made of glass. A mask 54 is attached to the under side of the plate 46 with a portion thereof in alignment with the aperture 50. The mask 54 may be made of metal, Micarta or had fiber board preferably about .008 to .010″ thick. The mask 54 has a sharp edge aperture 56 therein. Length 56L of the aperture 56 is equal to or slightly less than the length of cathode 44AC and has a greater width at the socket end of the tube 44A than at the other end. The width of the end of aperture 56 remote from the socket of the tube 44A is no greater than about ½ the diameter of the cathode 44AC. A light source 58A is mounted on the L-shaped bracket 42 directly above the tube 44A. The bracket 42 has a slot 60 in its vertical leg for receiving a capscrew 62 which is threaded into the bracket 32A. The light source 58A may be a G. E. Model CR–7505–C–201 utilizing a 6 volt lamp type GE–1323.

Phototubes 44B and 44C which are supported by brackets 32B and 32C are the same type as phototube 44A and light sources 58B and 58C associated with phototubes 44B and 44C are the same as light source 58A. As shown in FIGURE 8 each light source 58A, 58B and 58C is provided with an individual variable AC power source which includes a potentiometric rheostat 60 and a step-down transformer 62. Power for the transformer 62 is provided from a 115 volt AC power source L1, L2. The power for the phototubes 44A, 44B and 44C is provided by a DC power source 64 which includes a 115 to 325 volt step-up transformer 66 having its primary connected to the power supply L1, L2. The transformer 66 is connected to rectifier bridge 68, the output of which is stabilized by a 20,000 ohms resistance 70 and an 8 mfd. capacitance 72 connected in parallel across the bridge 68. Anodes 44AA, 44BA and 44CA are connected to the positive terminal of the power source and the cathodes 44AC, 44BC and 44CC are connected to the negative terminal through resistances 74A, 74B and 74C. These resistances are of equal value and in the particular arrangement shown impose a load of 3.3 megohms in series with each tube. Resistances 76A, 76B and 76C are connected to the cathodes 44AC, 44BC and 44CC, respectively. These resistances each have a value of one megohm and are connected at point 78. Lead 80 is connected between cathode 44BC and resistance 76B and leads to a recording ammeter 82. A lead 84 is also connected to recording ammeter 82 from point 78. The recording ammeter 82 should be of a high impedance type capable of measuring the amount and direction of current flow in resistance 76B. An Esterline Angus Recorder Model S–601–S is satisfactory. The characteristics of this circuit are such that current flows only when the cathodes of the phototubes receive an unequal amount of light and then only if the average of the sum of the voltage effects of the illumination at tubes 44A and 44C is greater or less than the voltage effect of the illumination at tube 44B.

In operation, the enclosures 48 for tubes 44A, 44B and 44C are aligned with one another parallel to the longitudinal center line of the processing line or moving strip S. This is done by loosening the screws 38 and adjusting the screws 40 to move the brackets 32A, 32B and 32C. The mask 54 is then prepared with the exact dimensions of the aperture 56 being determined. This is done by measuring the tube output at various degrees of blockage using a flat metal plate as a blocking medium and a trial mask having a rectangular opening of the dimensions previously mentioned. The procedure is repeated with the width of the aperture adjacent the socket end of the tube being increased in width until a straight line curve output vs. blockage is obtained. This is necessary because to precisely measure deviation of the edge from a straight line of travel requires that the voltage effect at each station vary directly with the amount of light blockage occasioned by the strip at that station. For the light sources and tubes mentioned above it has been determined that the desired linear curve is obtained with a trapezoidal aperture, the sloping sides of which diverge about 2° toward the socket end of the tube. With the exact size and shape of the aperture 56 being determined the mask 54 is placed in position.

It is also essential that each of the light sources 58A, 58B and 58C supply an equal maximum illumination to their respective tubes. This is accomplished by illuminating the tubes with the strip S removed and adjusting the power supply to each light source by means of the rheostats 60 to provide a uniform voltage drop of about 4 volts across the resistances 74A, 74B and 74C.

The apparatus is now ready for use. In those cases where the strip S is of uniform width throughout its length, the cross-head 14 will be positioned so that the edge of the strip S adjacent the brackets 32A, 32B and 32C will be over the center of the aperture 56. If the strip varies in width or different widths of strip are being processed, the Askania Edge Control will maintain the edge of the strip in this position.

Assuming that an ideal length of strip S is passing from roll 4 to roll 6 one half the light from the light sources 58A, 58B and 58C will be interrupted by the strip S. In this case, for the particular equipment shown and described, a potential of 2 volts will appear across resistances 74A, 74B and 74C. Thus there will be equal potential at points 78, 86, 88 and 90 so that no current will flow in resistance 76B and recorder 82 will register zero deflection.

Assuming that a section of the strip S which is cambered toward the right now reaches the gauge and that the camber is such that the edge of the strip passes over the centers of the apertures associated with phototubes 44A and 44C while the edge passes over the aperture associated with phototube 44B to cover only ¼ of its associated aperture. When this occurs points 78, 86 and 90 will be 2 volts above the negative side of the supply and point 88 will be 3 volts above the negative side. Thus point 88 is one volt higher than point 78 and current will flow through resistance 76B causing the recorder 82 to register a negative deviation, the amount of which is the equivalent of ¼ of the length of the cathode of the phototubes or 3/16″, this amount occurring in the distance between phototubes 44A and 44C which is 4½ ft. For a section of the strip having the same amount of camber of opposite hand, the recorder 82 will register a positive deviation of the same amount.

Assume further that another section of the strip passes through the gauge to cover ½ of the aperture associated with tube 44A, to cover ¾ of the aperture associated with tube 44B, and ⅞ of the aperture associated with tube 44C. Under these conditions the potential at point 86 is 2 volts, at point 88, one volt, at point 90, ½ volt, and at point 78, 1¼ volts which is ¼ volt higher than point 88. Thus current will flow through resistance 76B toward point 88 and the recorder 82 will register a positive deviation of 3/16″. Such a deviation in many processes could not be tolerated and at least this portion of the strip would have to be removed. The specific apparatus disclosed is sensitive to less than .001″ deviation in 4½ ft.

While one embodiment of our invention has been shown and described it will be apparent that other adaptations and modifications may be made without departing from the scope of the following claims.

We claim:
1. The method of determining camber in a moving strip which comprises moving the strip longitudinally with one edge of the strip passing three longitudinally spaced apart aligned stations, measuring the transverse distance of said one edge from each of said stations and comparing the transverse distances of the said one edge from each station.

2. Apparatus for determining camber in a moving strip which comprises means for moving the strip longitudinally, three longitudinally spaced apart aligned stations arranged adjacent one edge of the moving strip, means for measuring the transverse distance of said one edge from each of said stations and means for comparing the transverse distances of the said one edge from each station.

3. Apparatus for determining camber in a moving strip which comprises means for moving the strip longitudinally, three longitudinally spaced apart aligned stations arranged adjacent one edge of the moving strip, means for measuring the transverse distance of said one edge from each of said stations and means for maintaining said stations at a predetermined location with respect to the said one edge of said strip.

4. Apparatus for determining camber in a moving strip which comprises means for moving the strip longitudinally in a generally horizontal path, three longitudinally spaced aligned stations adjacent one edge of the strip, each of said stations including a light source and a photosensitive device located on opposite sides of the strip, the photosensitive devices at the three stations being equally spaced horizontally from the longitudinal center of the strip, means responsive to light on said photosensitive devices for measuring the transverse distance of said one edge from each of said stations and means for maintaining said stations at a predetermined location with respect to said one edge of said strip.

5. Apparatus for determining camber in a moving strip which comprises means for moving the strip longitudinally in a generally horizontal path, three longitudinally spaced aligned stations adjacent one edge of the strip, each of said stations including a light source and a photosensitive device located on opposite sides of the strip, said photosensitive device having an elongated cathode arranged transversely of the strip, an enclosure for said photosensitive device, said enclosure having an opening therein on the side adjacent the strip, a mask for said opening, said mask having an elongated aperture therein aligned with the said cathode, said aperture having a maximum width adjacent the socket end of the photosensitive device and gradually decreasing in width to its opposite end, the photosensitive devices and apertures at the three stations being equally spaced horizontally from the longitudinal center of the strip, means responsive to light on said photosensitive devices for measuring the transverse distance of said one edge from each of said stations and means for comparing the transverse distances of the said one edge from each station.

6. Apparatus for determining camber in a moving strip which comprises means for moving the strip longitudinally in a generally horizontal path, three longitudinally spaced aligned stations adjacent one edge of the strip, each of said stations including a light source and a photosensitive device located on opposite sides of the strip, said photosensitive device having an elongated cathode arranged transversely of the strip, an enclosure for said photosensitive device, said enclosure having an opening therein on the side adjacent the strip, a mask for said opening, said mask having an elongated aperture therein aligned with the said cathode, said aperture having a maximum width adjacent the socket end of the photosensitive device and gradually decreasing in width to its opposite end, the photosensitive devices and apertures at the three stations being equally spaced horizontally from the longitudinal center of the strip, means responsive to light on said photosensitive devices for measuring the transverse distance of said one edge from each of said stations and means for maintaining said stations at a predetermined location with respect to said one edge of said strip.

7. Apparatus for determining camber in a moving strip which comprises means for moving the strip longitudinally in a generally horizontal path, a horizontal beam member adjacent one edge of the strip with its longitudinal center parallel to the longitudinal center of the strip, three longitudinally spaced aligned stations supported by said beam member adjacent said one edge of the strip, each of said stations including a light source and a photosensitive device located on opposite sides of the strip, said photosensitive device having an elongated cathode arranged transversely of the strip, an enclosure for said photosensitive device, said enclosure having an opening therein on the side adjacent the strip, a mask for said opening, said mask having an elongated aperture therein aligned with the said cathode, said aperture having a maximum width adjacent the socket end of the photosensitive device and gradually decreasing in width to its opposite end, the photosensitive devices and apertures at the three stations being equally spaced horizontally from the longitudinal center of said horizontal beam member, and means responsive to light on said photosensitive devices for measuring the transverse distance of said one edge from each of said stations.

8. Apparatus for determining camber in a moving strip which comprises means for moving the strip longitudinally in a generally horizontal path, a base member arranged below and transversely of the path of movement of said strip, a cross-head mounted on said base member for movement transversely of the strip, an edge follower for maintaining said cross-head at a predetermined location with respect to one edge of said strip, means on said base member extending upwardly above the path of travel of said strip, a horizontal beam member attached to the top of said last named means, three longitudinally spaced aligned stations supported by said beam member adjacent said one edge of the strip, and means for measuring the transverse distance of said one edge from each of said stations.

9. Apparatus for determining camber in a moving strip which comprises means for moving the strip longitudinally in a generally horizontal path, a base member arranged below and transversely of the path of movement of said strip, a cross-head mounted on said base member for movement transversely of the strip, an edge follower for maintaining said cross-head at a predetermined location with respect to one edge of said strip, means on said base member extending upwardly above the path of travel of said strip, a horizontal beam member attached to the top of said last named means, three longitudinally spaced aligned stations supported by said beam member adjacent said one edge of the strip, each of said stations including a light source and a photosensitive device located on opposite sides of the strip, the photosensitive devices at the three stations being equally space horizontally from the longitudinal center of the strip, and means responsive to light on said photosensitive devices for measuring the transverse distance of said one edge from each of said stations.

10. Apparatus for determining camber in a moving strip which comprises means for moving the strip longitudinally in a generally horizontally path, a base member arranged below and transversely of the path of movement of said strip, a cross-head mounted on said base member for movement transversely of the strip, an edge follower for maintaining said cross-head at a predetermined location with respect to one edge of said strip, means on said base member extending upwardly above the path of travel of said strip, a horizontal beam member attached to the top of said last named means, three longitudinally spaced aligned stations supported by said beam member adjacent said one edge of the strip, each of said stations including a light source and a photosensitive device located on opposite sides of the strip, said photosensitive device having an elongated cathode arranged transversely of the strip, an enclosure for said photosensitive device, said enclosure having an opening therein on the side adjacent the strip, a mask for said opening, said mask having an elongated aperture therein aligned with the said cathode, said aperture having a maximum width adjacent the socket end of the photosensitive device and gradually decreasing in width to its opposite end, the photosensitive device and apertures at the three stations being equally spaced horizontally from the longitudinal center of said horizontal beam member, and means responsive to light on said photosensitive devices for measuring the transverse distance of said one edge from each of said stations.

11. Apparatus for determining camber in a moving strip which comprises means for moving the strip longitudinally in a generally horizontal path, three longitudinally spaced aligned stations adjacent one edge of the strip, each of said stations including a light source and a photosensitive device located on opposite sides of the strip, the photosensitive devices at the three stations being equally spaced horizonally from the longitudinal center of the strip, means responsive to light on said photosensitive devices for measuring the transverse distance of said one edge from each of said stations and means for comparing the transverse distances of the said one edge from each station.

12. Apparatus for determining camber in a moving strip which comprises means for moving the strip longitudinally, three longitudinally spaced aligned stations adjacent one edge of the strip, each of said stations including a light source and a photo sensitive device located on opposite sides of the strip, an enclosure for each photo sensitive device, each enclosure having an elongated aperture therein on the side adjacent the strip, the apertures at the three stations being equally spaced from the longitudinal center of the strip, means responsive to light on said photo sensitive devices for measuring the transverse distance of said one edge from each of said stations and means for comparing the transverse distances of the said one edge from each station.

13. Apparatus for determining camber in a moving strip which comprises means for moving the strip longitudinally, a beam member adjacent one edge of the strip with its longitudinal center parallel to the longitudinal center of the strip, three longitudinally spaced aligned stations supported by said beam member adjacent said one edge of the strip, each of said stations including a light source and a photo sensitive device located on opposite sides of the strip, an enclosure for each photo sensitive device, each enclosure having an elongated aperture therein on the side adjacent the strip, the apertures at the three stations being equally spaced from the longitudinal center of the strip, means responsive to light on said photo sensitive devices for measuring the transverse distance of said one edge from each of said stations and means for comparing the transverse distances of the said one edge from each station.

References Cited

UNITED STATES PATENTS

| | | | |
|---|---|---|---|
| 2,344,817 | 3/1944 | Hlavaty | 250—219 |
| 2,499,910 | 3/1950 | Frommer | 88—14 |
| 2,581,937 | 1/1952 | Secrest | 250—219 |
| 2,777,069 | 1/1957 | Saeman | 88—14 |
| 2,931,917 | 4/1960 | Beelitz | 88—14 |
| 3,226,832 | 1/1966 | Fell | 88—14 |
| 3,330,159 | 7/1967 | Ongaro | 33—174 |
| 3,284,015 | 11/1966 | King | 226—20 X |

FOREIGN PATENTS 871,325  6/1961  Great Britain.

RALPH G. NILSON, *Primary Examiner.*

C. LEEDOM, *Assistant Examiner.*

U.S. Cl. X.R.

73—159; 88—14; 33—174; 72—12; 226—19; 250—237